United States Patent
Cordes et al.

(10) Patent No.: US 9,936,031 B2
(45) Date of Patent: Apr. 3, 2018

(54) GENERATION OF CONTENT RECOMMENDATIONS

(71) Applicant: International Business Machines Corporation, Armonk, NY (US)

(72) Inventors: Michael J. Cordes, Newburgh, NY (US); Hui W. Han, Liao Ning Province (CN); Tolga Oral, Winchester, MA (US); Bin Zhu, Liao Ning (CN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 14/673,996

(22) Filed: Mar. 31, 2015

(65) Prior Publication Data

US 2016/0294961 A1 Oct. 6, 2016

(51) Int. Cl.
*G06F 15/16* (2006.01)
*H04L 29/08* (2006.01)
*H04L 12/26* (2006.01)
*G06Q 30/06* (2012.01)

(52) U.S. Cl.
CPC ......... *H04L 67/22* (2013.01); *G06Q 30/0631* (2013.01); *H04L 43/16* (2013.01); *H04L 67/025* (2013.01)

(58) Field of Classification Search
CPC ....... H04L 67/22; H04L 67/025; H04L 43/16; G06Q 30/0631
USPC .......................................................... 709/203
See application file for complete search history.

(56) References Cited

U.S. PATENT DOCUMENTS

| 7,289,985 | B2 * | 10/2007 | Zeng ................ G06F 17/30616 707/749 |
| 7,490,045 | B1 * | 2/2009 | Flores .................... G06Q 10/10 702/62 |
| 8,010,460 | B2 * | 8/2011 | Work ..................... G06Q 10/00 705/319 |
| 8,447,852 | B1 | 5/2013 | Penumaka et al. |
| 8,452,832 | B2 * | 5/2013 | Berkhin ............ G06F 17/30702 705/14.66 |
| 8,489,515 | B2 | 7/2013 | Mathur |

(Continued)

FOREIGN PATENT DOCUMENTS

WO    2013138969 A1    9/2013

OTHER PUBLICATIONS

Oral et al., "Dealing with the Cold Start Problem when Providing Personalized Enterprise Content Recommendations," ACM Group 2010 Collective Intelligence in Organizations, Oct. 2010, 4 pages.

(Continued)

*Primary Examiner* — Michael Y Won
(74) *Attorney, Agent, or Firm* — Michael O'Keefe

(57) ABSTRACT

A computer identifies data detailing usage of a first set of one or more applications by a first user and a first set of users, and information associated with usage of a second set of one or more applications by the first set of users. The computer determines one or more similarity coefficients between the first user and the first set of users and determines an overall predicted taste score for each content associated with the second set of one or more applications based on the determined one or more similarity coefficients. The computer determines one or more recommendations for one or more contents of the second set of one or more applications based on the determined one or more overall predicted taste scores.

17 Claims, 3 Drawing Sheets

(56) References Cited

U.S. PATENT DOCUMENTS

| | | | |
|---|---|---|---|
| 9,026,643 B2* | 5/2015 | Ishioka | G06F 17/30572 707/748 |
| 2003/0018636 A1* | 1/2003 | Chi | G06F 17/30867 |
| 2003/0066025 A1* | 4/2003 | Garner | G06F 17/30654 715/256 |
| 2006/0173838 A1* | 8/2006 | Garg | G06Q 30/02 |
| 2006/0200556 A1* | 9/2006 | Brave | G06F 17/30867 709/224 |
| 2008/0052371 A1* | 2/2008 | Partovi | G06Q 10/10 709/217 |
| 2009/0150545 A1* | 6/2009 | Flores | G06Q 10/10 709/224 |
| 2010/0121850 A1* | 5/2010 | Moitra | G06Q 30/02 707/737 |
| 2012/0096088 A1* | 4/2012 | Fahmy | G06Q 10/10 709/204 |
| 2013/0110922 A1 | 5/2013 | Shih et al. | |
| 2013/0185355 A1* | 7/2013 | Tseng | H04L 65/403 709/204 |
| 2013/0212109 A1* | 8/2013 | Evancich | G06F 17/30598 707/740 |
| 2014/0108427 A1 | 4/2014 | Spiegel | |
| 2015/0106801 A1* | 4/2015 | Agrawal | G06F 8/60 717/177 |
| 2016/0094567 A1* | 3/2016 | Borland | H04L 63/0457 713/154 |
| 2016/0191639 A1* | 6/2016 | Dai | G06Q 30/0255 709/204 |
| 2016/0294961 A1* | 10/2016 | Cordes | H04L 67/22 |

OTHER PUBLICATIONS

Jacovi et al, "Digital Traces of Interest: Deriving Interest Relationships from Social Media Interactions," ECSCW 2011: Proceedings of the 12th European Conference on Computer Supported Cooperative Work, Sep. 24-28, 2011, Aarhus, Denmark, pp. 21-40.

Howison et al, "Validity Issues in the Use of Social Network Analysis with Digital Trace Data," Journal of the Association for Information Systems, vol. 12, Issue 12, Dec. 2011, pp. 767-797.

Craig, "Facebook and College Students: Is Marketing Effective?," University of Tennessee, May 2011, 22 pages.

* cited by examiner

GENERATION OF CONTENT RECOMMENDATIONS

TECHNICAL FIELD

The present invention relates generally to content recommendations, and more particularly to generating content recommendations for an application.

BACKGROUND

Learning software applications, such as a word processor or a web browser has become part and parcel of our everyday lives. Indeed, just to obtain entry level employment for a company, one must be at least proficient with several software applications. Furthermore, finding specific or relevant content within an application or across multiple applications can be a daunting task for an employee of a multi-national or large corporation due to the sheer amount content created by the employees of the corporation.

SUMMARY

The present invention provides a method, system, and computer program product for determining one or more content recommendations. A computer identifies data detailing usage of a first set of one or more applications by a first user and a first set of users, and information associated with usage of a second set of one or more applications by the first set of users. The computer determines one or more similarity coefficients between the first user and the first set of users and determines an overall predicted taste score for each content associated with the second set of one or more applications based on the determined one or more similarity coefficients. The computer determines one or more recommendations for one or more contents of the second set of one or more applications based on the determined one or more overall predicted taste scores.

DETAILED DESCRIPTION

Embodiments of the present invention will now be described in detail with reference to the accompanying Figures.

Figure 1:
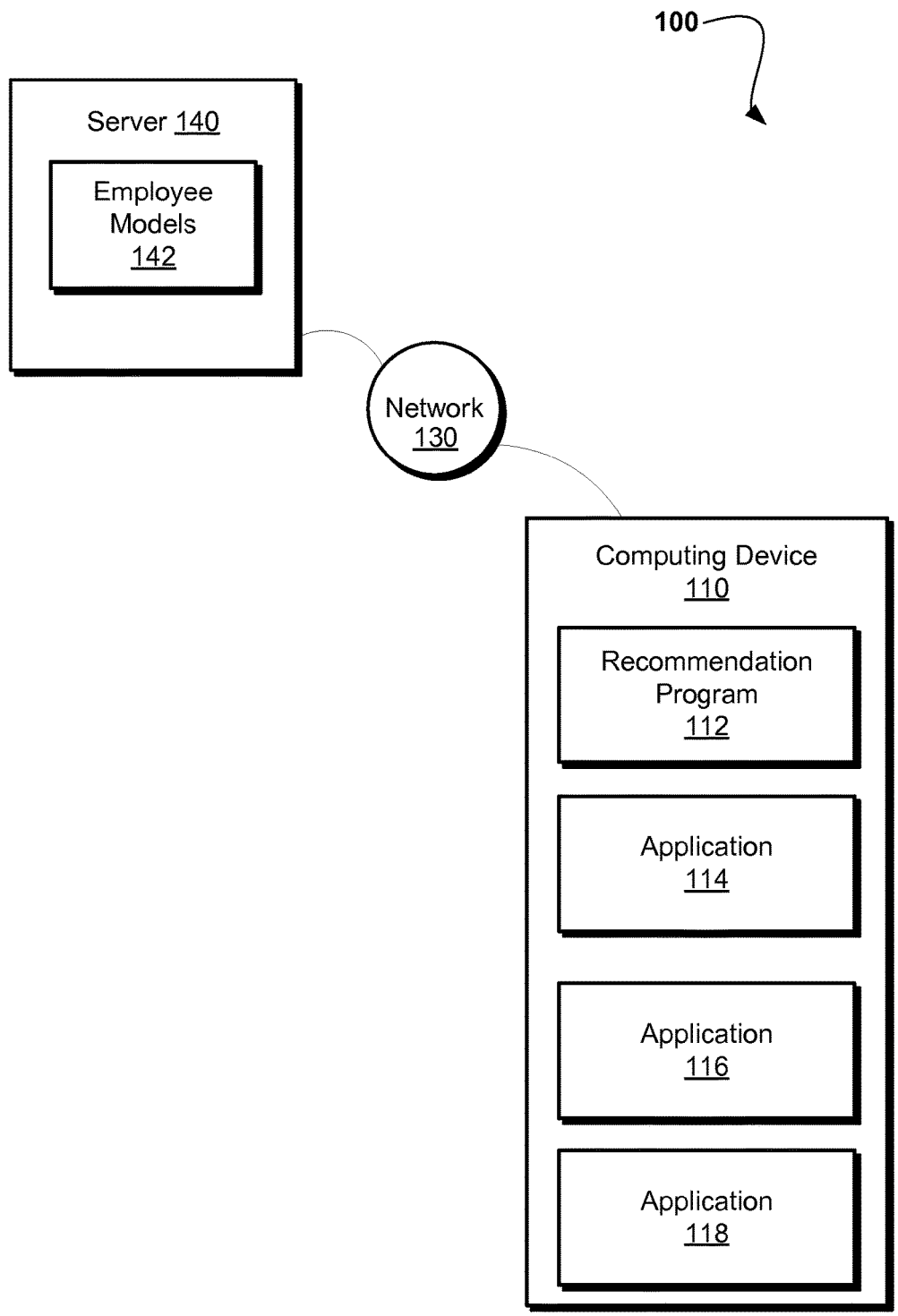
FIG. 1 illustrates a recommendation generation system, in accordance with an embodiment of the invention.

FIG. 1 illustrates recommendation generation system 100, in accordance with an embodiment of the invention. In an exemplary embodiment, recommendation generation system 100 includes computing device 110 and server 140 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between computing device 110 and server 140.

Server 140 includes employee models 142. Server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, server 140 can comprise a cluster of web servers executing the same software to collectively process the requests for the web pages as distributed by a front end server and a load balancer. Server 140 is described in more detail with reference to FIG. 3.

Employee models 142 is data related to employee utilization of one or more applications. In the example embodiment, employee models 142 may include information such as ratings of available content, which may include explicit preferences (such as like/dislike or extent to which liked/dislike—for example on a scale of 0 to 5) and/or implicit preferences (such as finishing reading online documentation or closing a presentation after 5 min may indicate like and dislike respectively), source information (software application corresponding to the content and all relevant meta information about the application), employee information, actions taken by employees such as an employee's digital trace or navigation path, and time information regarding actions taken by employees. While in the example embodiment, employee models 142 includes data associated with employees of an organization or multiple organizations, in other embodiments, employee models 142 may include information associated with another group of users, such as a social media group or a professional network.

Computing device 110 includes recommendation program 112 and application 114. Computing device 110 may be a desktop computer, a notebook, a laptop computer, a tablet computer, a handheld device, a smart-phone, a thin client, or any other electronic device or computing system capable of receiving and sending data to and from other computing devices, such as server 140, via network 130. Although not shown, optionally, computing device 110 can comprise a cluster of web devices executing the same software to collectively process requests. Computing device 110 is described in more detail with reference to FIG. 3.

Applications 116 and Application 118 are software applications such as a word processor, web application, a mobile application, or other type of application.

Application 114 is a software application such as a word processor, web application, a mobile application or other type of application. In the example embodiment, application 114 is an application for which recommendation program 112 will provide recommendations for to the user of computing device 110 based on information retrieved from employee models 142.

Recommendation program 112 is capable of monitoring the usage of application 114 and determine a level of usage of application 114 by the user of computing device 110. Recommendation program 112 is also capable of referencing employee models 142 via network 130 in order to determine similarity coefficients between the user of computing device 110 and other users. Recommendation program 112 is also capable of determining one or more recommendations to provide to the user of computing device 110 based on the determined similarity coefficients and information present within employee models 142. In the example embodiment, recommendation program 112 is partially integrated with application 114, however, in other embodiments, recommendation program 112 may be fully integrated or completely separate from application 114. The operations and functions of recommendation program 112 is described in more detail with reference to FIG. 2.

Figure 2:
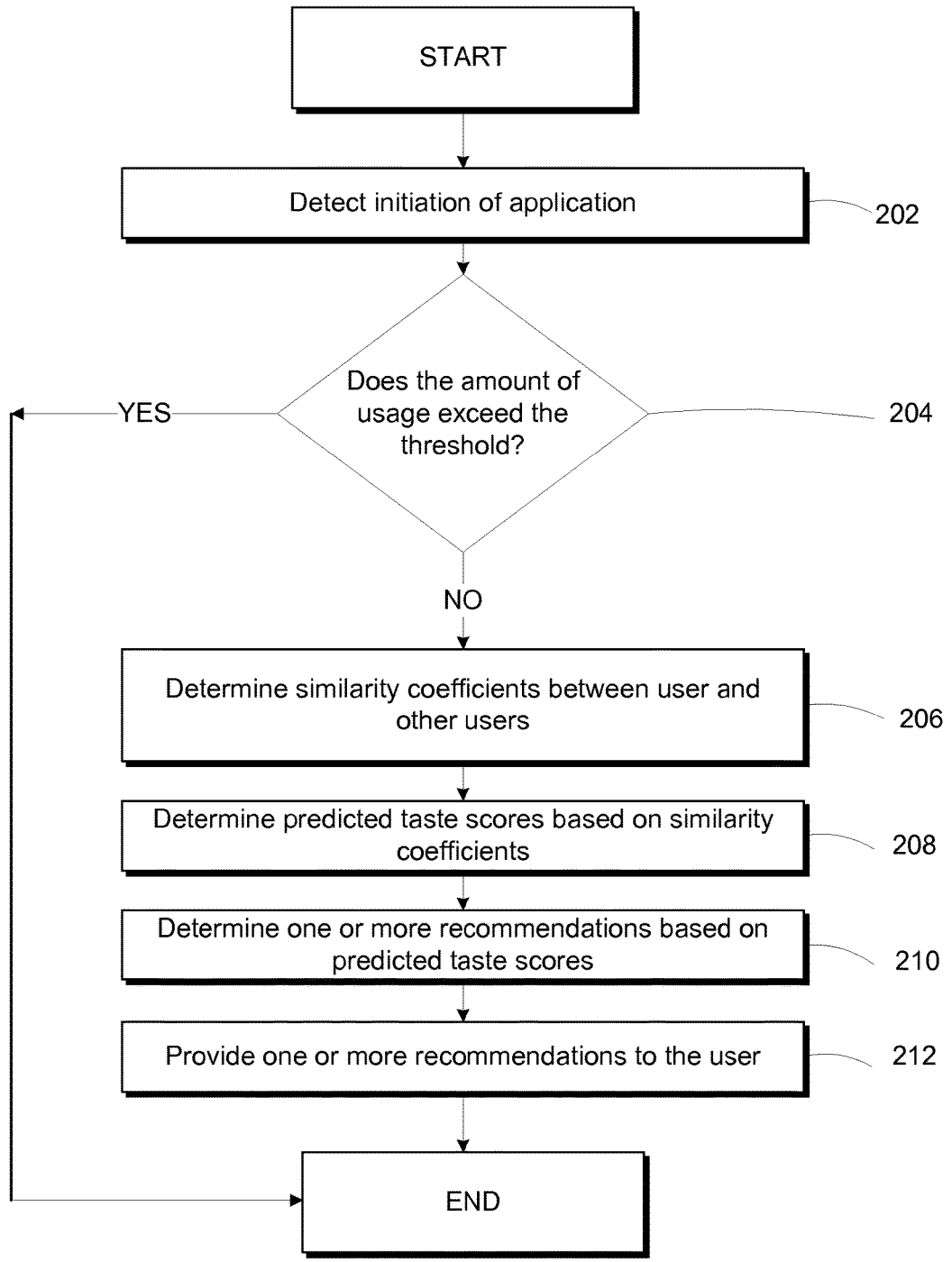
FIG. 2 is a flowchart illustrating the operations of the recommendation program of FIG. 1 in generating a recommendation based on determining an overall predicted taste score, in accordance with an embodiment of the invention.

FIG. 2 is a flowchart illustrating the operations of recommendation program 112 in determining one or more recommendations for content associated with application 114 to provide a user based on determined similarity coefficients between a group of users, in accordance with an exemplary embodiment of the invention. In the example embodiment, recommendation program 112 detects the initiation of application 114 by the user of computing device 110 (step 202). In the example embodiment, recommendation program 112 is able to detect the initiation of application 114 by way of communication with the operating system. In other embodiments, recommendation program 112 is able to detect the initiation of application 114 due to being integrated with application 114.

Recommendation program 112 then determines whether the amount of usage of application 114 by the user of computing device 110 exceeds a first threshold value (decision 204). In the example embodiment, recommendation program 112 determines whether the amount of usage of application 114 exceeds five (the first threshold value). In other words, recommendation program 112 determines if application 114 has been opened by the user of computing device 110 on more than five separate occasions. In the example embodiment, recommendation program 112 communicates with the operating system to determine the amount of usage of application 114 by the user of computing device 110. In other embodiments, recommendation program 112 communicates directly with application 114 in order to determine the amount of usage information of application 114 by the user of computing device 110. If recommendation program 112 determines that the amount of usage of application 114 exceeds the first threshold value (decision 204, "YES" branch), recommendation program 112 does not provide any recommendations based on a comparison to other users/employees. In the example embodiment, if the usage of application 114 exceeds the first threshold value, recommendation program 112 does not provide recommendations (based on a comparison to other users/employees) because the user of computing device 110 has been determined to be familiar with the program, and therefore, recommendations may be provided based on previous usage of application 114 by the user of computing device 110. In other embodiments, recommendation program 112 may continue to provide recommendations based on a comparison to other users/employees (in the manner discussed below) regardless of whether the amount of usage of application 114 exceeds the first threshold value.

If recommendation program 112 determines that the amount of usage of application 114 does not exceed the first threshold value (decision 204, "YES" branch), recommendation program 112 determines the similarity coefficient between the user of computing device 110 and other users/employees by utilizing information contained in employee models 142 retrieved from server 140 via network 130 (step 206). In the example embodiment, recommendation program 112 determines the similarity coefficient between the user of computing device 110 and other users or members of a particular group such as members of a work group, workers with the same employer, or a social media network. For example, recommendation program 112 may determine the similarity coefficient between two users (or a group of users) who work for a particular employer. Furthermore, in the example embodiment, recommendation program 112 utilizes information retrieved from employee models 142 regarding multiple applications other than application 114 in determining the similarity coefficient between the user of computing device 110 and other users.

For example, recommendation program 112 may retrieve the following information from employee models 142:

| Application 116 | ML1 | ML2 | ML3 | ML4 | ML5 | ML6 | ML7 |
|---|---|---|---|---|---|---|---|
| User A | Y |   | Y | Y | Y |   |   |
| User B | Y | Y |   | Y | Y | Y |   |
| User C |   |   | Y | Y | Y | Y | Y |
| User D |   | Y | Y |   |   |   | Y |

| Application 118 | AS1 | AS2 | AS3 | AS4 | AS5 | AS6 | AS7 |
|---|---|---|---|---|---|---|---|
| User A | 5 |   | 1 | 1 | 3 |   |   |
| User B | 4 |   |   | 1 | 4 | 3 |   |
| User C |   |   | 3 | 4 | 5 | 4 | 5 |
| User D |   | 5 | 5 |   | 1 |   | 4 |

| Application 114 | T1 | T2 | T3 | T4 | T5 | T6 | T7 |
|---|---|---|---|---|---|---|---|
| User A |   |   |   |   |   |   |   |
| User B | 4 |   |   | 1 | 4 | 3 |   |
| User C |   |   |   | 4 | 5 | 4 | 5 |
| User D |   | 5 | 1 |   | 4 |   | 4 |

In the example embodiment, recommendation program 112 determines the similarity coefficient between the user of computing device 110 and other users by way of utilizing the equation (Jaccard method) shown below:

$$J(A, B) = \frac{|A \cap B|}{|A \cup B|} \quad (1)$$

In other embodiments, recommendation program 112 may determine the similarity coefficient between the user of computing device 110 and the other users by way of utilizing the cosine similarity method or other methods (discussed further below).

With regard to application 116, the information above depicts information (in a Boolean manner) that may describe an explicit preference (such as like/dislike, "Y" may correspond to like) or an implicit preference (whether the user finished reading the material or spent a requisite amount of time viewing the material—"Y" may refer to finished reading or requisite amount of time was spent) for specific content (ML1 through ML7) associated with a first application are shown above for 4 specific users: User A, User B, User C, and User D. As discussed above, information retrieved from employee models 142 may also detail explicit preferences such as a rating for specific content (illustrated with regard to applications 118 and application 114). In some cases, for example, if the user has not utilized specific content (or does not like the content), no preference is shown (User A has no preference for ML2). In the example embodiment, recommendation program 112 utilizes equation 1 to determine the similarity coefficient between the user of computing device 110 (which in this example is User A) and the other users (User B, User C, and User D). The similarity coefficient between User A and User B is as shown below:

$$\frac{ML1 + ML4 + ML5}{ML1 + ML3 + ML4 + ML5 + ML6} = 3/5 \quad (a)$$

As shown above, the similarity coefficient is equal to the sum of the number of specific content which have been utilized (or which has an associated positive preference) by both User A and User B divided by the number of specific content utilized (or which has an associated positive preference) by either User A or User B. In this case, the similarity coefficient between User A and User B equals ⅗. The similarity coefficients between all the users is shown below:

|        | User A | User B | User C | User D |
|--------|--------|--------|--------|--------|
| User A | 1      | ⅗      | ⅜      | ⅙      |
| User B | ⅗      | 1      | ⅜      | 0      |
| User C | ⅜      | ⅜      | 1      | ⅖      |
| User D | ⅙      | 0      | ⅖      | 1      |

Although the similarity coefficients are shown above for all user combinations, in the example embodiment, recommendation program 112 may only calculate the similarity coefficients with respect to User A (the user of computing device 110). In addition, recommendation program 112 may utilize methods other than the Jaccard method, such as utilizing cosine similarity, or similar functions (described in further detail below).

With regard to application 118, recommendation program may also utilize the Jaccard method as described above (or a similar method) by utilizing Boolean values (Y/N, true/false, utilized/not utilized), however, recommendation program 112 may also utilize the cosine similarity method by utilizing equation 2 depicted below:

$$\text{similarity} = \cos((\theta)) = \frac{A \cdot B}{\|A\| \|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \quad (2)$$

With regard to equation 2, n is the number of content associated with an application, A, is the preference (such as a rating) associated with the first user being compared with regard to each specific content, and $B_i$ is the preference (or rating) associated with the second user being compared with regard to each specific content. Referring to the example depicted above, n=7, and for i=1, $A_i$=5, and $B_i$=4. Utilizing equation 2 shown above, the similarity coefficients between all the users are determined as shown below:

|        | User A | User B | User C | User D |
|--------|--------|--------|--------|--------|
| User A | 1      | 0.848  | 0.384  | 0.192  |
| User B | 0.848  | 1      | 0.582  | 0.133  |
| User C | 0.384  | 0.582  | 1      | 0.550  |
| User D | 0.192  | 0.133  | 0.550  | 1      |

In order to determine the overall similarity coefficient between users, recommendation program 112 takes the average of the similarity coefficients that have been calculated for each application as shown below;

|        | User A | User B | User C | User D |
|--------|--------|--------|--------|--------|
| User A | 1      | 0.724  | 0.442  | 0.179  |
| User B | 0.724  | 1      | 0.541  | 0.066  |
| User C | 0.442  | 0.541  | 1      | 0.441  |
| User D | 0.179  | 0.066  | 0.441  | 1      |

In other embodiments, weights may be assigned to similarity coefficients of certain applications (based on the amount/accuracy of data or importance of the application, for example) in order to determine the overall similarity coefficient between users. In further embodiments, for applications that have associated non-Boolean data (such as application 118), the non-Boolean data may be converted to Boolean data. For example, for non-Boolean data that is on a scale of 0-5, preference data that is 2 or less is given a Boolean value of 0 and preference data that is 3 or greater is given a value of 1 (or "Y"). Recommendation program 112 may then merge the data and determine a similarity coefficient in the manner described above from the merged data. Similarly, Boolean data may also be converted to non-Boolean data, by for example, converting non-Boolean data that is a non-zero value (such as 1 or "Y") to a 5 (assuming a scale of 0-5). Furthermore, although the methods utilized in the example above are the Jaccard method and the cosine similarity method, other similar methods may be utilized to determine the similarity coefficient Recommendation program 112 determines a predicted taste score between the user of computing device 110 and each other user/employee for each specific content of application 114 based on the determined overall similarity coefficients (step 208). In the example embodiment, once a similarity coefficient is determined between the user of computing device 110 and each of the other users for each specific content, recommendation program 112 utilizes the similarity coefficients for each pair of users and the ratings for each specific content of application 114 to determine a predicted taste score for each specific content of application 114 (for utilization in determining recommendations to provide the user of computing device 110). For example, for content T1, only User B has provided a rating. Therefore, the similarity coefficient between User A (the user of computing device 110) and User B (0.724) is multiplied by the rating information associated with User B (4) to calculate the predicted taste score for T1 (2.896). The determined predicted taste scores for each specific content (with respect to the user of computing device 110/User A and each of the other users is shown below:

| User   | Content | Users  | Preference Taste Score |
|--------|---------|--------|------------------------|
| User A | T1      | User B | 2.896                  |
|        | T2      | User D | 0.895                  |
|        | T3      | User D | 0.179                  |
|        | T4      | User B | 0.724                  |
|        |         | User C | 1.768                  |
|        | T5      | User B | 2.896                  |
|        |         | User C | 2.21                   |
|        |         | User D | 0.716                  |
|        | T6      | User B | 2.172                  |
|        |         | User C | 1.768                  |
|        | T7      | User C | 2.21                   |
|        |         | User D | 0.716                  |

Recommendation program 112 may determine an overall predicted taste score for each specific content by averaging the preference taste scores determined for each specific content. For example, for the content T4, recommendation program 112 adds up the predicted taste score corresponding to the User A/User B combination (0.724) and the predicted taste score corresponding to the User A/User C combination (1.768) and divides by the number of combinations (2) in order to get the overall predicted taste score for content T4 (1.246).

The overall (aggregate) predicted taste scores corresponding to each specific content are shown below:

| User | Recommendation | Overall score |
|---|---|---|
| User A | T1 | 2.896 |
|  | T2 | 0.895 |
|  | T3 | 0.179 |
|  | T4 | 2.130 |
|  | T5 | 4.180 |
|  | T6 | 3.056 |
|  | T7 | 2.568 |

The overall predicted taste scores in the order of recommendation are shown below:

| User | Recommendation | Overall score |
|---|---|---|
| User A | T5 | 4.180 |
|  | T6 | 3.056 |
|  | T1 | 2.896 |
|  | T7 | 2.568 |
|  | T4 | 2.130 |
|  | T2 | 0.895 |
|  | T3 | 0.179 |

Recommendation program 112 may also determine an overall predicted taste score for each specific content using a geometric progression with a scale factor based on importance of popularity as shown below;

$$\text{Overall\_predicted\_score} = \frac{\text{predicted\_score}(UserA - User_1)}{\text{scale\_factor}^0} + \ldots + \frac{\text{predicted\_score}(UserA - User_i)}{\text{scale\_factor}^{i-1}} \quad (3)$$

For example, using a scale factor of 2 for the content T4, recommendation program 112 determines an aggregate predicted taste score utilizing this method by reordering the predicted taste scores (from high to low) and adding the progression combination for User A/User C (1.768 divided by $2^0$) to the progression combination for User A/User B (0.724 divided by $2^1$) which results in 2.13. Performing the same computation for the content T5 (User A/User B, User A/User C, User A/User D), recommendation program 112 adds the progression combination for User A/User B (2.896 divided by $2^0$) to the progression combination for User A/User C (2.210 divided by $2^1$) and the User combination for User A/User D (0.716 divided by $2^2$) to yield an aggregate predicted taste score of 4.180. Utilizing geometric progression allows the higher predicted taste scores to have a greater impact to the overall predicted taste scores than lower predicted taste scores. Therefore, if a content has one predicted taste scores of 5 and one hundred predicted taste scores of 1, the overall predicted taste score will be higher if geometric progression is utilized than if the predicted taste scores were averaged.

Recommendation program 112 determines one or more recommendations based on the overall predicted taste scores (step 210) and presents the one or more recommendations to the user of computing device 110 (step 212). In the example embodiment, recommendation program 112 presents the user of computing device 110 a recommendation for the content with the highest overall predicted taste score. In other embodiments, recommendation program 112 presents the user of computing device 110 with one or more recommendations for content that has a corresponding overall predicted taste score above a threshold value, such as 1.5. Referring to the aforementioned example, recommendation program 112 determines that content T5 has the highest overall predicted taste score, and therefore, recommendation program 112 presents a recommendation for the content T5 via a notification, such as a popup.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
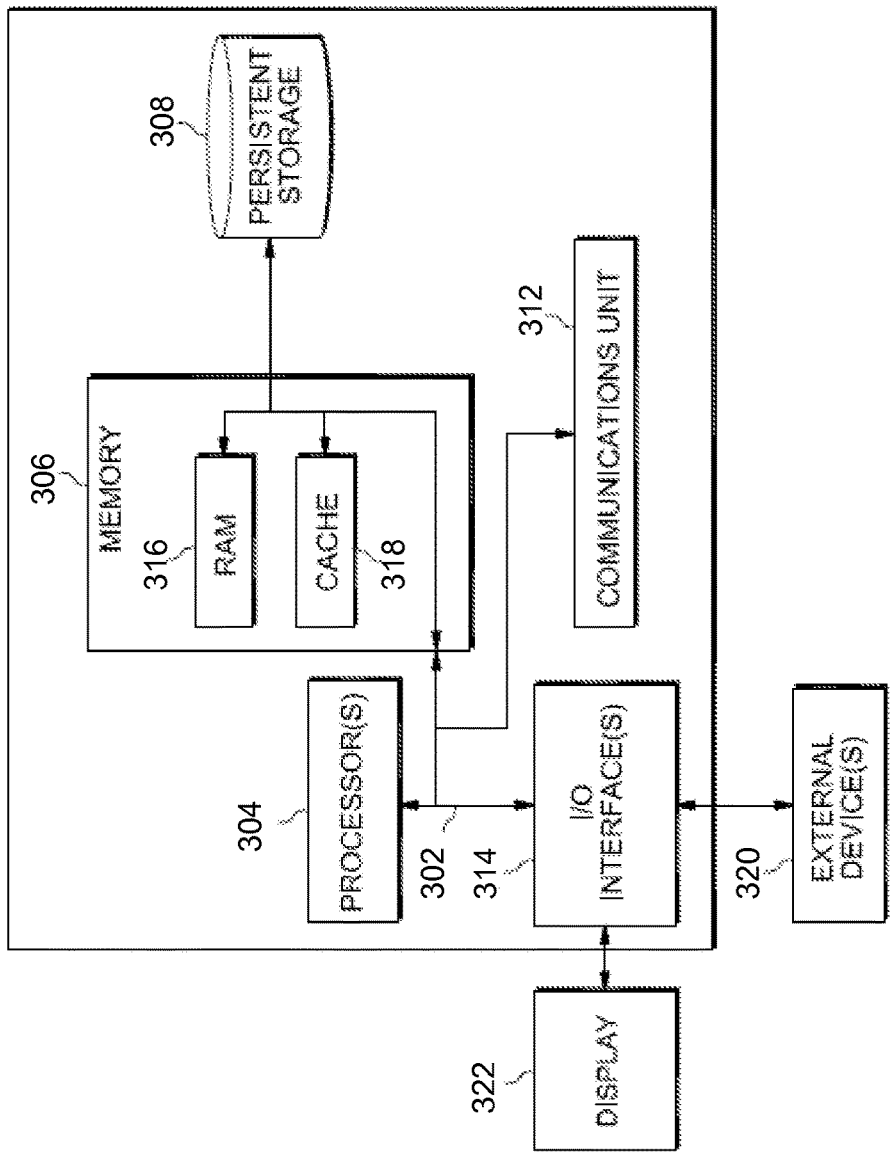
FIG. 3 is a block diagram depicting the hardware components of the recommendation generation system of FIG. 1, in accordance with an embodiment of the invention.

FIG. 3 depicts a block diagram of components of computing device 110 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs recommendation program 112, application 114, application 116, and application 118 in computing device 110; and employee models 142 in server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs recommendation program 112, application 114, application 116, and application 118 in computing device 110; and employee models 142 in server 140, may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs recommendation program 112, application 114, application 116, and application 118 in computing device 110; and employee models 142 in server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining one or more content based recommendations, comprising the steps of:
   identifying, by a computing device, data detailing usage of a first set of one or more applications by a first user and a first set of users, and information associated with usage of a second set of one or more applications by the first set of users, wherein the data detailing usage of the first set of one or more applications and the information associated with usage of the second set of one or more applications by the first set of users is determined based on a digital trace and a navigation path associated with the first user and the first set of users;
   determining, by the computing device, one or more similarity coefficients between the first user and the first set of users, wherein each of the one or more similarity coefficients is a first numerical value that describes a level of similarity between the first user and a user of the first set of users with regard to the use of the first set of one or more applications, wherein determining the first numerical value comprises performing a calculation selected from the group consisting of:
   using a Jaccard method; and
   using a cosine similarity method;
   determining, by the computing device, an overall predicted taste score for each content associated with the second set of one or more applications based on the determined one or more similarity coefficients, wherein each overall predicted taste score is a second numerical value that describes a level of relevance of a content associated with the second set of one or more applications to the first user, and wherein each overall predicted taste score based on averaging preference taste scores determined for the each content, wherein the preference taste score is associated with each one of the first set of users, and wherein the second set of one or more applications based on the determined one or more similarity coefficients;
   determining, by the computing device, one or more recommendations for one or more contents of the second set of one or more applications based on the determined one or more overall predicted taste scores; and
   based on initiation of the second set of one or more applications, presenting, by the computing device, the determined one or more recommendations corresponding to the initiated one or more applications based on the determined one or more overall predicted taste scores.

2. The method of claim 1, further comprising the computing device determining that the amount of usage of the second set of one or more applications by the first user does not exceed a threshold value.

3. The method of claim 1, wherein the step of determining the one or more similarity coefficients between a first user and a first set of users with regard to the user of a first set of one or more applications further comprises:
   the computing device dividing a number of content utilized by the first user and one or more of the first set of users by a number of content utilized by at least one of the first user and the one or more of the first set of users.

4. The method of claim 1, wherein the step of determining an overall predicted taste score for each content associated with the second set of one or more applications based on the determined one or more similarity coefficients further comprises:
   the computing device determining that two combinations of users are associated with a first content associated with the second set of applications, wherein the first combination of users includes the first user and a second user, and the second combination of users includes the first user and a third user;
   the computing device determining a first predicted taste score for the first combination of users by multiplying a similarity coefficient associated with the first combination of users with a rating associated with the second user;
   the computing device determining a second predicted taste score for the second combination of users by multiplying a similarity coefficient associated with the second combination of users with a rating associated with the third user; and
   the computing device determining an overall predicted taste score for the first content by averaging the first predicted taste score and the second predicted taste score.

5. The method of claim 1, wherein the step of determining an overall predicted taste score for each content associated with the second set of one or more applications based on the determined one or more similarity coefficients further comprises:
the computing device determining that two combinations of users are associated with a first content associated with the second set of applications, wherein the first combination of users includes the first user and a second user, and the second combination of users includes the first user and a third user;
the computing device determining a first predicted taste score for the first combination of users by multiplying a similarity coefficient associated with the first combination of users with a rating associated with the second user;
the computing device determining a second predicted taste score for the second combination of users by multiplying a similarity coefficient associated with the second combination of users with a rating associated with the third user; and
the computing device determining an overall predicted taste score for the first content by utilizing one or more scale factors associated with each of the first predicted taste score and the second predicted taste score.

6. The method of claim 1, wherein the data detailing usage of a first set of one or more applications by a first user and a first set of users includes Boolean values describing the usage of the first set of one or more applications by the first user and the first set of users.

7. A computer program product for determining one or more content based recommendations, the computer program product comprising:
one or more computer-readable storage devices and program instructions stored on at least one of the one or more computer-readable storage devices, the program instructions comprising:
program instructions to identify data detailing usage of a first set of one or more applications by a first user and a first set of users, and information associated with usage of a second set of one or more applications by the first set of users, wherein the data detailing usage of the first set of one or more applications and the information associated with usage of the second set of one or more applications by the first set of users is determined based on a digital trace and a navigation path associated with the first user and the first set of users;
program instructions to determine one or more similarity coefficients between the first user and the first set of users, wherein each of the one or more similarity coefficients is a first numerical value that describes a level of similarity between the first user and a user of the first set of users with regard to the use of the first set of one or more applications, wherein determining the first numerical value comprises performing a calculation selected from the group consisting of:
using a Jaccard method; and
using a cosine similarity method;
program instructions to determine an overall predicted taste score for each content associated with the second set of one or more applications based on the determined one or more similarity coefficients, wherein each overall predicted taste score is a second numerical value that describes a level of relevance of a content associated with the second set of one or more applications to the first user and wherein each overall predicted taste score based on averaging preference taste scores determined for the each content, wherein the preference taste score is associated with each one of the first set of users, and wherein the second set of one or more applications based on the determined one or more similarity coefficients;
program instructions to determine one or more recommendations for one or more contents of the second set of one or more applications based on the determined one or more overall predicted taste scores; and
based on initiation of the second set of one or more applications, program instructions to present the determined one or more recommendations corresponding to the initiated one or more applications based on the determined one or more overall predicted taste scores.

8. The computer program product of claim 7, further comprising program instructions to determine that the amount of usage of the second set of one or more applications by the first user does not exceed a threshold value.

9. The computer program product of claim 7, wherein the program instructions to determine the one or more similarity coefficients between a first user and a first set of users with regard to the user of a first set of one or more applications further comprises:
program instructions to divide a number of content utilized by the first user and one or more of the first set of users by a number of content utilized by at least one of the first user and the one or more of the first set of users.

10. The computer program product of claim 7, wherein the program instructions to determine an overall predicted taste score for each content associated with the second set of one or more applications based on the determined one or more similarity coefficients further comprises:
program instructions to determine that two combinations of users are associated with a first content associated with the second set of applications, wherein the first combination of users includes the first user and a second user, and the second combination of users includes the first user and a third user;
program instructions to determine a first predicted taste score for the first combination of users by multiplying a similarity coefficient associated with the first combination of users with a rating associated with the second user;
program instructions to determine a second predicted taste score for the second combination of users by multiplying a similarity coefficient associated with the second combination of users with a rating associated with the third user; and
program instructions to determine an overall predicted taste score for the first content by averaging the first predicted taste score and the second predicted taste score.

11. The computer program product of claim 7, wherein the program instructions to determine an overall predicted taste score for each content associated with the second set of one or more applications based on the determined one or more similarity coefficients further comprises:
program instructions to determine that two combinations of users are associated with a first content associated with the second set of applications, wherein the first combination of users includes the first user and a second user, and the second combination of users includes the first user and a third user;
program instructions to determine a first predicted taste score for the first combination of users by multiplying a similarity coefficient associated with the first combination of users with a rating associated with the second user;

program instructions to determine a second predicted taste score for the second combination of users by multiplying a similarity coefficient associated with the second combination of users with a rating associated with the third user; and program instructions to determine an overall predicted taste score for the first content by utilizing one or more scale factors associated with each of the first predicted taste score and the second predicted taste score.

12. The computer program product of claim 7, wherein the data detailing usage of a first set of one or more applications by a first user and a first set of users includes Boolean values describing the usage of the first set of one or more applications by the first user and the first set of users.

13. A computer system for determining one or more content based recommendations, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to identify data detailing usage of a first set of one or more applications by a first user and a first set of users, and information associated with usage of a second set of one or more applications by the first set of users, wherein the data detailing usage of the first set of one or more applications and the information associated with usage of the second set of one or more applications by the first set of users is determined based on a digital trace and a navigation path associated with the first user and the first set of users;

program instructions to determine one or more similarity coefficients between the first user and the first set of users, wherein each of the one or more similarity coefficients is a first numerical value that describes a level of similarity between the first user and a user of the first set of users with regard to the use of the first set of one or more applications, wherein determining the first numerical value comprises performing a calculation selected from the group consisting of:
using a Jaccard method; and
using a cosine similarity method;

program instructions to determine an overall predicted taste score for each content associated with the second set of one or more applications based on the determined one or more similarity coefficients, wherein each overall predicted taste score is a second numerical value that describes a level of relevance of a content associated with the second set of one or more applications to the first user and wherein each overall predicted taste score based on averaging preference taste scores determined for the each content, wherein the preference taste score is associated with each one of the first set of users, and wherein the second set of one or more applications based on the determined one or more similarity coefficients;

program instructions to determine one or more recommendations for one or more contents of the second set of one or more applications based on the determined one or more overall predicted taste scores; and based on initiation of the second set of one or more applications, program instructions to present the determined one or more recommendations corresponding to the initiated one or more applications based on the determined one or more overall predicted taste scores.

14. The computer system of claim 13, further comprising program instructions to determine that the amount of usage of the second set of one or more applications by the first user does not exceed a threshold value.

15. The computer system of claim 13, wherein the program instructions to determine the one or more similarity coefficients between a first user and a first set of users with regard to the user of a first set of one or more applications further comprises:

program instructions to divide a number of content utilized by the first user and one or more of the first set of users by a number of content utilized by at least one of the first user and the one or more of the first set of users.

16. The computer system of claim 13, wherein the program instructions to determine an overall predicted taste score for each content associated with the second set of one or more applications based on the determined one or more similarity coefficients further comprises:

program instructions to determine that two combinations of users are associated with a first content associated with the second set of applications, wherein the first combination of users includes the first user and a second user, and the second combination of users includes the first user and a third user;

program instructions to determine a first predicted taste score for the first combination of users by multiplying a similarity coefficient associated with the first combination of users with a rating associated with the second user;

program instructions to determine a second predicted taste score for the second combination of users by multiplying a similarity coefficient associated with the second combination of users with a rating associated with the third user; and program instructions to determine an overall predicted taste score for the first content by averaging the first predicted taste score and the second predicted taste score.

17. The computer system of claim 13, wherein the program instructions to determine an overall predicted taste score for each content associated with the second set of one or more applications based on the determined one or more similarity coefficients further comprises:

program instructions to determine that two combinations of users are associated with a first content associated with the second set of applications, wherein the first combination of users includes the first user and a second user, and the second combination of users includes the first user and a third user;

program instructions to determine a first predicted taste score for the first combination of users by multiplying a similarity coefficient associated with the first combination of users with a rating associated with the second user;

program instructions to determine a second predicted taste score for the second combination of users by multiplying a similarity coefficient associated with the second combination of users with a rating associated with the third user; and program instructions to determine an overall predicted taste score for the first content by utilizing one or more scale factors associated with each of the first predicted taste score and the second predicted taste score.

* * * * *